March 24, 1931.   R. C. SCHEMMEL   1,798,035
ORNAMENTAL CONDUIT FOR ELECTRIC WIRES
Filed Jan. 14, 1930   2 Sheets-Sheet 1
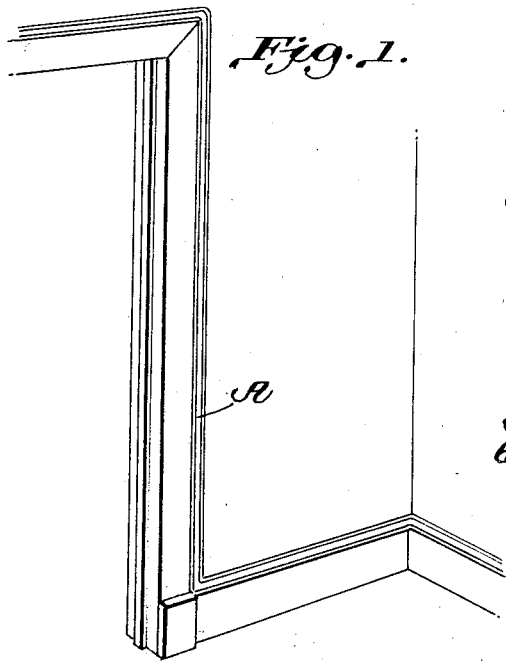
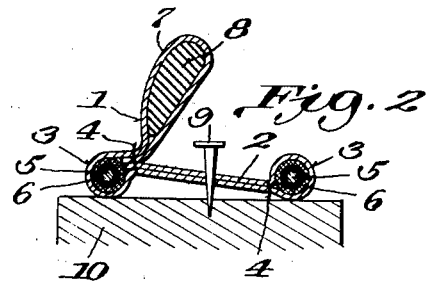
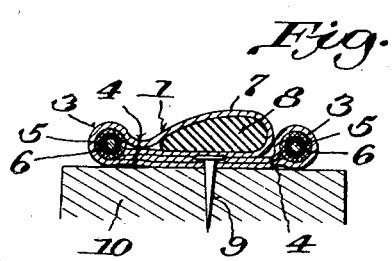
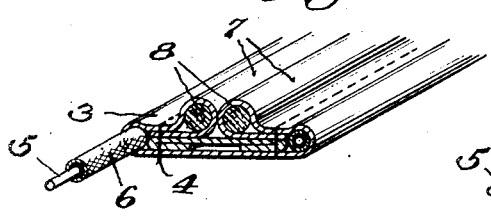
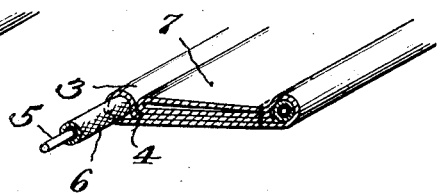
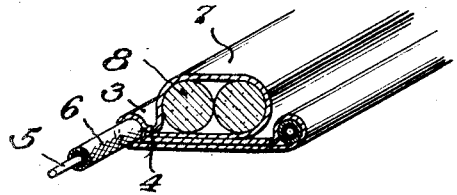
Inventor
Robert C. Schemmel
By Dype and Kirchner
Attorneys

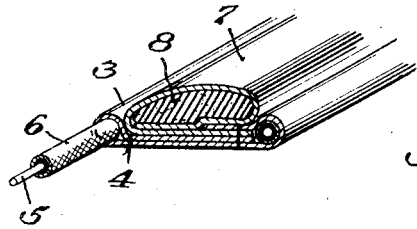
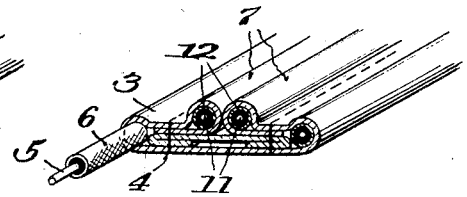
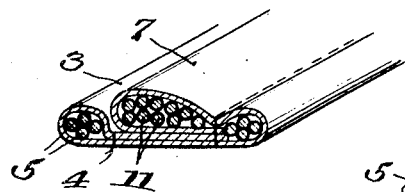
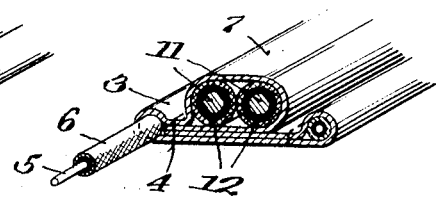
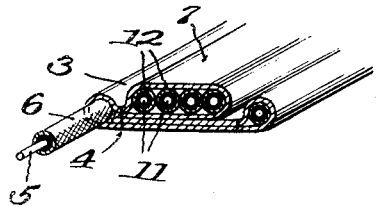
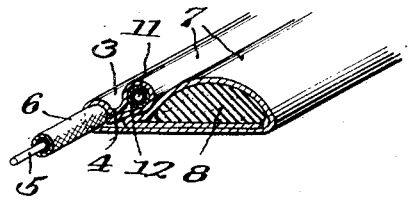

Patented Mar. 24, 1931

1,798,035

UNITED STATES PATENT OFFICE

ROBERT C. SCHEMMEL, OF UNION CITY, INDIANA

ORNAMENTAL CONDUIT FOR ELECTRIC WIRES

Application filed January 14, 1930. Serial No. 420,795.

My invention relates to ornamental conduits for electric wires primarily adapted for installation in exposed places where appearance is a consideration.

More specifically, my present invention contemplates the provision of a jacket enclosing an electric wire, or a plurality of electric wires, which will be characterized by an exceedingly high electrical efficiency and which will constitute also a neat and attractive appearing fixture for the outer or exposed surfaces of walls, baseboards, door and window frames, etc.

One object of my present invention is to provide an electric wire carrying conduit of the character indicated which may readily and expeditiously be fastened to walls, floors and the like, and which is provided with means inherent in the structure itself for completely and effectually concealing, when in applied position, the fastening means.

By my present invention I provide a modification of and improvement on the type of ornamental conductor shown and described in United States Letters Patent No. 1,713,302, issued to me on May 14, 1929.

In addition to attaining all the objects of the ornamental conductor shown in my Patent No. 1,713,302, my present invention contemplates certain other objects, among which may be mentioned: a superior electrical efficiency achieved by spacing a pair of electric conducting wires a maximum distance apart; a practically complete elimination of the possibility of short circuiting the conductors in the act of applying the structure; the provision of an improved tack concealing element and a consequent increase in the ease and facility with which the structure may be applied; and the production of a structure which will be of exceedingly simple construction and which may be manufactured at a minimum cost.

More specifically my present invention contemplates an improvement over the structure shown in my Patent No. 1,713,302 whereby the spacing of a pair of electric wires in the conduit structure is such as to minimize magnetic induction and other undesirable electrical phenomena in the adjacent wires, and consequently more perfectly to adapt the conduit to use in connection with radio installations and other applications, where high frequency currents and currents of low amperage are to be conducted.

Furthermore, the same spacing arrangement enables currents of relatively high voltage to be transmitted over the spaced wires without danger of short circuiting.

Another object of my present invention, in certain forms of embodiment, is to provide a conduit having the ornamental characteristics described above containing a relatively large number of electric wires, adapted especially to annunciator systems, where it is necessary to provide a multiplicity of independent electric conductors, radio installations, where a single cable is required containing separate connections between the receiving set and the positive and negative terminals of A, B and C batteries, loud speaker, antenna, ground etc., and any other electrical use where many independent, insulated conductors must be disposed for a distance in parallel relation.

Other objects and advantages will sufficiently appear from the description hereinafter of the invention in certain preferred embodiments, taken in conjunction with the accompanying drawings and the appended claims.

In the drawings which form part of this application for Letters Patent and in which like reference characters designate corresponding parts in the several views, Figure 1 is a perspective view of one corner of the interior of a room showing a wall, a baseboard and a door frame, with a length of my improved wire conductor applied in operative position;

Fig. 2 is a cross sectional view of a preferred embodiment of my invention, showing the conductor deformed during the applying operation;

Fig. 3 is a view similar to Fig. 2, but showing the conductor in applied position; and Figs. 4 to 12 inclusive are perspective views, showing with one end in section certain modified embodiments of my present invention.

Referring now to the drawings, Figure 1 depicts a corner of the interior of a room showing a length of ornamental conduit designated A constructed in accordance with the principles of my present invention applied to the walls thereof adjacent the baseboard and door frame. The inconspicuous and ornamental character of the conduit will be clearly apparent from this illustration.

As shown in the remaining figures, the conduit comprises an enveloping web, which may or may not be continuous, as will be presently pointed out, designated generally 1, of any suitable fabric, such, for example as leather, leatherized cloth, paper, asbestos, or the like, or combinations of these materials. The enclosing fabric 1 is folded upon itself to provide a base portion 2, consisting of a plurality of plies of the material, and having at each longitudinal margin thereof a bead 3 which is preferably of substantially cylindrical interior configuration and may be of parti-cylindrical exterior contour. The plies of the fabric at the inner edges of the bead are preferably secured together by means of a line of stitching 4, and if desired, the contacting areas of the material in the base portion may be united and stiffened by means of a suitable adhesive.

Within one or both of the bead portions 3 are contained electric conducting wires 5, encased in any suitable non-conducting material such as rubber, impregnated fibrous material, or a combination of both, as shown at 6 in the drawings, according to common insulating practice. If wire is used in only one of the two marginal beads, the other bead may contain a dummy filler, of the same diameter as the non-conducting material 6, formed of twisted paper, rubber or the like, as will readily be understood.

A portion of the covering material 1 is extended from a line adjacent to one of the marginal beads 3, to provide an additional loop or bead 7, which is disposed in hinged relation to the base portion 2, as clearly shown in Figures 2 to 6 inclusive. When all the wires which the conduit is intended to carry may be contained in the beads 3, I prefer to enclose in the loop or bead 7 a suitable filler 8, of extruded rubber, twisted paper, or the like, as shown in Figures 2, 3, 4, 6, 7 and 12. In the interest of economy however, the loop or bead 7 may be left empty, as shown in Figure 5. Figure 6 shows a modification of the invention in which a plurality of fillers 8 are contained in the bead 7; and in the embodiment shown in Figure 4, a single filler 8 is contained within each of a pair of oppositely disposed loops 7.

It will be observed that in each of the forms of my invention illustrated on the accompanying drawings, a relatively wide area of the covering material is disposed between the wire containing beads 3. This area is adapted to receive tacks, nails, or analogous fastening means 9, which may be passed through the base portion 2 at spaced intervals therein, to secure the composite structure in place upon a surface 10 of plaster, wood or the like. It will be clear that this fastening operation is accomplished by first deforming the structure to lift the loop 7, with or without its contained filler as the case may be, away from the tack-receiving area of the base 2. When the tacking operation has been completed, the tack-concealing loop 7 is permitted to resume its normal position of contact with the base.

Figure 7 shows a modification of the invention designed to meet the requirements of certain installations where it is desired to employ a conduit exhibiting two different colors, or two different qualities of covering material. I attain this effect by forming the conduit from a web of covering material which is not continuous, but is made up of a plurality of fabrics, suitably united along their edges by stitching or cement, and associated in such a way that one type of fabric will constitute the tack concealing bead 7, and another or a plurality of other types will constitute the wire receiving base beads. The details of construction of one preferred form of two-color conduit will be clearly apparent from Figure 7. It is to be understood that similar or analogous modifications may be made in the structure of the types of conduit shown in the other figures in ways which will be obvious. It is therefore to be understood that the term "covering fabric" used in the appended claims is by no means to be regarded as signifying only a fabric formed of a single, continuous web of material, but contemplates as well such covering fabrics as are formed of a plurality of pieces joined together in any way.

While it will be obvious that in the embodiments of my invention shown in Figures 2 to 7, inclusive, electric wires may be contained in only a single bead, if desired, it is to be observed that these figures show conduits having in each case no more than a single wire in each of two beads. As has been pointed out hereinabove, it is often desirable in annunciator, radio and other installations to employ a cable having more than a pair of wires. To meet such requirements, my invention may be embodied in conduit structures formed as shown in Figures 8 to 11, inclusive, each of which contains more than a pair of conductors.

Thus the conduit of Figure 8 will be seen to be similar to that of Figure 4, excepting that the tack concealing beads 7 are here shown each containing instead of the dummy filler 8, an additional electric wire 11, and, of course, if desired, insulating material 12 similar to the non-conductors 5 in the base beads.

Figure 9 shows a construction similar to that of Figures 2 and 3, with, however, a multiplicity of electric wires 5 encased in the tack concealing bead 7 instead of the filler 8.

Figures 10 and 11 illustrate further modifications of this same structure to meet a demand for a conduit containing multiple circuit conductors in relatively small number but of heavier gauge wire.

Figure 12 shows a sort of combination of the types of conduit appearing in Figures 8 and 3. In other words, according to the teaching of Figure 12 the conduit is formed with a single base bead 3 containing an electric wire 5 and a pair of tack concealing beads 7, one containing an electric wire and the other containing a dummy filler 8, as in Figure 3.

From the foregoing description of the structural details and method of use of my present invention in several suggested forms of embodiment, it will be appreciated that I have provided a novel and useful conduit for electrical conductors whereby electric wire installations in the interior of rooms, where appearance is a matter of importance, may be accomplished in an expeditious and attractive manner, and with a high degree of electrical efficiency.

It is to be understood that my invention is capable of embodiment in other and different exemplifications, but all such modifications to the extent that they exhibit the principles of the invention are to be deemed within the scope and purview of the appended claims.

Having thus described my invention what I claim and desire to secure by Letters Patent is:

1. An ornamental conduit for electric wires comprising a covering fabric folded upon itself to provide a base portion and another portion adapted to cover a part of the base portion, in combination with an electric wire contained in each longitudinal edge of the base portion.

2. An ornamental conduit for electric wires comprising a covering fabric folded upon itself to provide a base portion and another portion adapted to cover a part of the base portion, in combination with a non-conducting element contained in each longitudinal edge of the base portion and an electric wire contained in each non-conducting element.

3. An ornamental conduit for electric wires comprising a covering fabric folded upon itself to provide a base portion, an electric wire contained in each opposite longitudinal edge of the base portion, the portion of the base between the wires constituting a tack receiving area, and another portion of the covering fabric being disposed to overlie and conceal the tack receiving area of the base portion.

4. An ornamental conduit for electric wires comprising a covering fabric folded upon itself to provide a base portion, tubular beads formed in the covering fabric along the longitudinal edges of the base portion, non-conducting material contained in the beads, electric wires contained in the non-conducting material, the portion of the base between the beads constituting a tack receiving area, and another portion of the covering fabric being disposed in hinged relation to the base whereby it normally covers and conceals the tack receiving area of the base but is capable of being forcibly lifted therefrom.

5. An ornamental conduit for electric wires comprising a covering fabric folded upon itself to provide a base portion and another portion adapted to cover a part of the base, in combination with an electric wire contained in each longitudinal edge of the base and another electric wire contained in the portion which is adapted to overlie the base.

6. An ornamental conduit for electric wires comprising a covering fabric folded upon itself to provide a base portion and another portion adapted to cover a part of the base, in combination with a non-conducting element contained in each longitudinal edge of the base and in the portion adapted to cover the base, and an electric wire contained in each of said non-conducting elements.

7. An ornamental conduit for electric wires comprising a covering fabric folded upon itself to provide a base portion, electric wires contained in the opposite longitudinal edges of the base portion, the portion of the base between the wires constituting a tack receiving area, and another portion of the covering fabric being disposed to overlie and conceal the tack receiving area of the base portion, in combination with an electric wire contained in the base overlying portion of the fabric.

In testimony whereof I affix my signature.

ROBERT C. SCHEMMEL.